United States Patent
Gero et al.

(10) Patent No.: US 8,761,034 B2
(45) Date of Patent: Jun. 24, 2014

(54) SYSTEM AND METHOD OF DEMULTIPLEXING PROVIDER BACKBONE BRIDGING TRAFFIC ENGINEERING INSTANCES

(75) Inventors: Balazs Peter Gero, Budapest (HU); Attila Takacs, Budapest (HU); Panagiotis Saltsidis, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 587 days.

(21) Appl. No.: 12/810,069

(22) PCT Filed: Feb. 10, 2009

(86) PCT No.: PCT/IB2009/000229
§ 371 (c)(1),
(2), (4) Date: Jun. 22, 2010

(87) PCT Pub. No.: WO2009/106943
PCT Pub. Date: Sep. 3, 2009

(65) Prior Publication Data
US 2010/0316058 A1 Dec. 16, 2010

Related U.S. Application Data

(60) Provisional application No. 61/031,855, filed on Feb. 27, 2008.

(51) Int. Cl.
*G01R 31/08* (2006.01)
*H04L 12/28* (2006.01)
*G06F 15/173* (2006.01)
*G06F 15/16* (2006.01)

(52) U.S. Cl.
USPC ........ 370/252; 370/395.5; 370/401; 709/239; 709/249

(58) Field of Classification Search
USPC .............. 370/252, 254, 395.5, 397, 401, 409; 709/239, 249
See application file for complete search history.

(56) References Cited

U.S. PATENT DOCUMENTS

| | | | |
|---|---|---|---|
| 2007/0086455 A1* | 4/2007 | Allan et al. | 370/389 |
| 2008/0170578 A1* | 7/2008 | Ould-Brahim | 370/401 |
| 2008/0170583 A1* | 7/2008 | Sultan et al. | 370/422 |
| 2008/0172497 A1* | 7/2008 | Mohan et al. | 709/249 |
| 2008/0228943 A1* | 9/2008 | Balus et al. | 709/239 |
| 2010/0039964 A1* | 2/2010 | Roy | 370/260 |
| 2010/0309894 A1* | 12/2010 | Csaszar et al. | 370/338 |

OTHER PUBLICATIONS

LAN/MAN standars committee, Virtual Bridged Local Area Networks—Amendment 6, Provider Backbone Bridges, Feb. 22, 2008, all pages.*
IEEE Computer Society: "Provider Backbone Bridge Traffic Enineerin" IEEE P802.1QAY/D2.0 Draft, [Online ]Feb. 15, 2008.

* cited by examiner

*Primary Examiner* — Brandon Renner (57) ABSTRACT

A system and method of demultiplexing Provider Backbone Bridging Traffic Engineering (PBB-TE) service instances. The method is used when monitoring service instances between a first bridge port and a second bridge port by exchanging CFM frames over each service instance. The CFM frame is received by the second bridge port where the complete ESP—3-tuple is demultiplexed. The CCM frames may be demultiplexed by a Full Traffic Engineering Service Instance Multiplex Entity which demultiplexes both the source address value and destination address value of the CCM frames.

23 Claims, 8 Drawing Sheets

SYSTEM AND METHOD OF DEMULTIPLEXING PROVIDER BACKBONE BRIDGING TRAFFIC ENGINEERING INSTANCES

This application claims the benefit of U.S. Provisional Application No. 61/031,855, filed Feb. 27, 2008, the disclosure of which is fully incorporated herein by reference.

TECHNICAL FIELD

The present invention relates generally to communications networks, and in particular, to communications networks that demultiplex Provider Backbone Bridging Traffic Engineering (PBB-TE) instances.

BACKGROUND

The Institute of Electrical and Electronics Engineers (IEEE) Provider Backbone Bridge Traffic Engineering defines how to support provisioning systems that explicitly select traffic engineered paths within Provider Backbone Bridge Networks by allowing a network operator to disable unknown destination address forwarding and source address learning. In addition, Provider Backbone Bridge Traffic Engineering extends the operation of Connectivity Fault Management to support provisioned paths.

PBB-TE defines point-to-point and point-to-multipoint service instances. A point-to-point PBB-TE service instance consists of two unidirectional point-to-point basic connectivity units called Ethernet Switched Paths (ESPs), one for each direction. A point-to-multipoint service instance consists of a downstream multicast point-to-multipoint ESP and "n" upstream point-to-point ESPs.

Maintenance Association End Points (MEPs) are used to monitor PBB-TE service instances. A point-to-point PBB-TE service instance is monitored by a pair of MEPs configured on the bridge ports that are connected by the PBB-TE point-to-point service instance. A point-to-multipoint PBB-TE service instance is monitored by "n" plus one MEPs looted on the bridge ports that are connected by the point-to-multipoint PBB-TE service instance. MEPs monitor the associated PBB-TE service instance by exchanging periodic Continuity Check Messages (CCMs) over the PBB-TE service instance.

On receipt of a CCM frame, a B-component of a Backbone Edge Bridge (BEB) relays the frame as a normal service frame to a Customer Backbone Port (CBP), which is the bridge port where the PBB-TE service instances are terminated. The CBP then demultiplexes the frames by a Backbone VLAN Identifier (B-VID). The CBP then recognizes that it is a CCM frame by an Equal OpCode Demultiplexer. The frame is passed on to a PBB-TE specific demultiplexer which checks the Backbone Source MAC Address (B-SA) and separates the CCMs that belong to the monitored PBB-TE service instance and forwards the CCM to the MEP Continuity Check Receiver.

Figure 1:
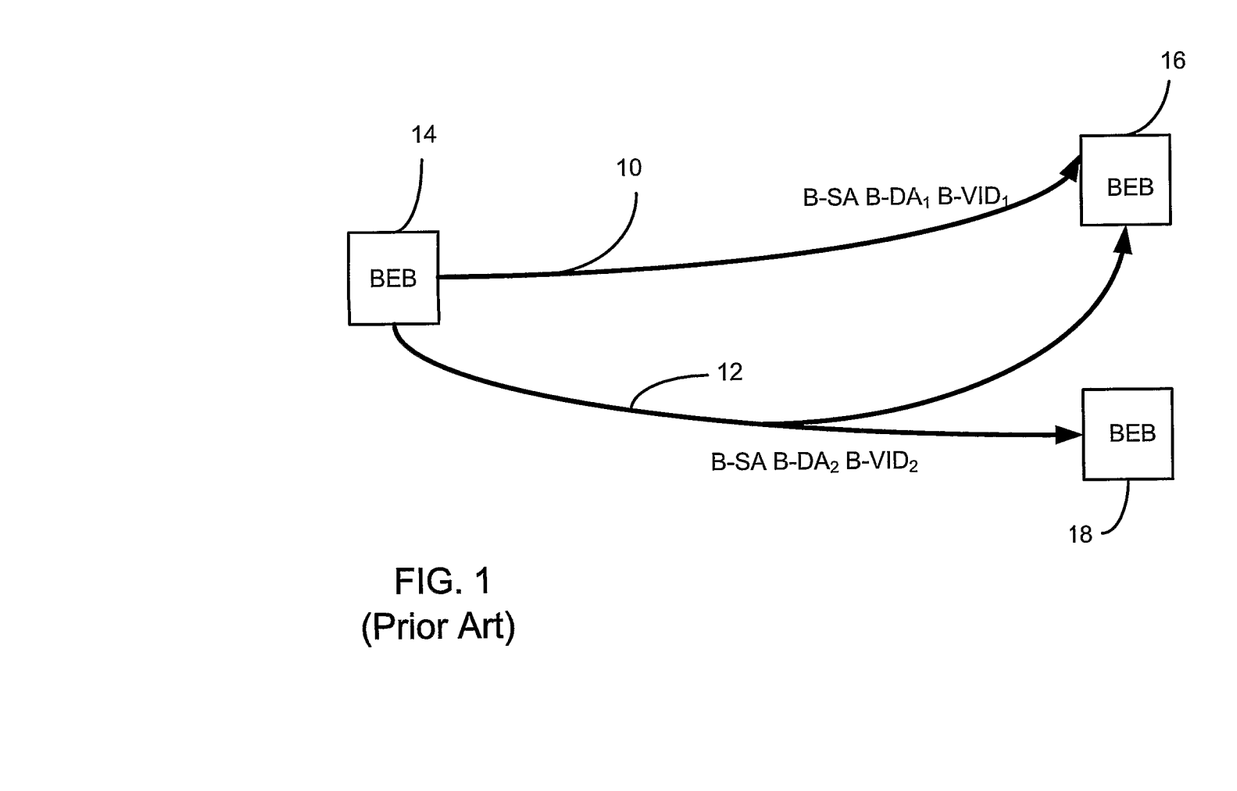
FIG. 1 (prior art) is a simplified block diagram of B-VID assignment restriction in an existing PBB-TE service instance.

FIG. 1 is a simplified block diagram of B-VID assignment restriction in an existing PBB-TE service instance. The system includes a first ESP 10, a second ESP 12, a first BEB 14, a second BEB 16, and a third BEB 18. FIG. 1 illustrates several shortcomings of the existing system. ESPs 10 and 12 share the same B-SA, but they have a different Backbone Destination MAC Address (B-DA). In general, the allocation of the ESP 3-tuples should allow the independent selection of B-VIDs for the two ESP because the ESP 3-tuples already differ in the B-DA. However, the existing system unnecessarily requires the allocation of different B-VIDs for the two ESPs (i.e., B-VID$_1 \neq$B-VID$_2$) because the CBP on the BEB 16 cannot distinguish between the CCM frames of the two incoming ESPs due to the common B-SA. This problem may occur when a point-to-multipoint PBB-TE service instance and a parallel point-to-point PBB-TE service instance is provisioned.

The problem with the existing solution is that it restricts the B-VID assignment of ESPs that connect the same two CBPs unnecessarily. In particular, a multicast point-to-multipoint ESP cannot have the same B-VID as a point-to-point ESP from the root to any of the leaves, or two parallel ESPs cannot share a B-VID even if their B-DA differ.

SUMMARY

The present invention enables the complete ESP 3-tuple <B-SA, B-DA, B-VID> to be used to demultiplex PBB-TE service instances in general and, in particular, the associated CFM frames.

Thus, in one embodiment, the present invention is directed to a method of demultiplexing PBB-TE service instances. The method begins by monitoring service instances between a first bridge port and a second bridge port by exchanging frames over each service instance. The frame is received by the second bridge port where the complete ESP 3-tuple is demultiplexed. A V-VID may then be allocated based on the complete demultiplexed 3-tuple.

In another embodiment, the present invention is directed to a system for demultiplexing PBB-TE service instances. The system includes a first bridge port and a second bridge port connected to the first bridge port by an ESP. The second bridge, port monitors service instances between the first bridge port and the second bridge port by exchanging frames over each service instance. The complete Ethernet Switched Path, ESP, 3-tuple of each frame received by the second bridge port is demultiplexed. A Backbone VLAN Identifier for each frame based on the demultiplexed 3-tuple may then be allocated. In one embodiment, a Full Traffic Engineering Service Instance Multiplex Entity demultiplexes a destination_address value and the source_address value from the frame.

In still another embodiment, the present invention is directed to a node for demultiplexing PBB-TE service instances. The node demultiplexes a complete ESP 3-tuple of a frame. The frame is used to monitor an ESP between a first bridge port and a second bridge and is associated with a specific service instance. The node then allocates a Backbone VLAN Identifier for each frame based on the demultiplexed 3-tuple.

DETAILED DESCRIPTION

The present invention is a system and method of demultiplexing PBB-TE service instances. The present invention utilizes full ESP 3-tuple for demultiplexing of CFM frames in CBPs.

Figure 2:
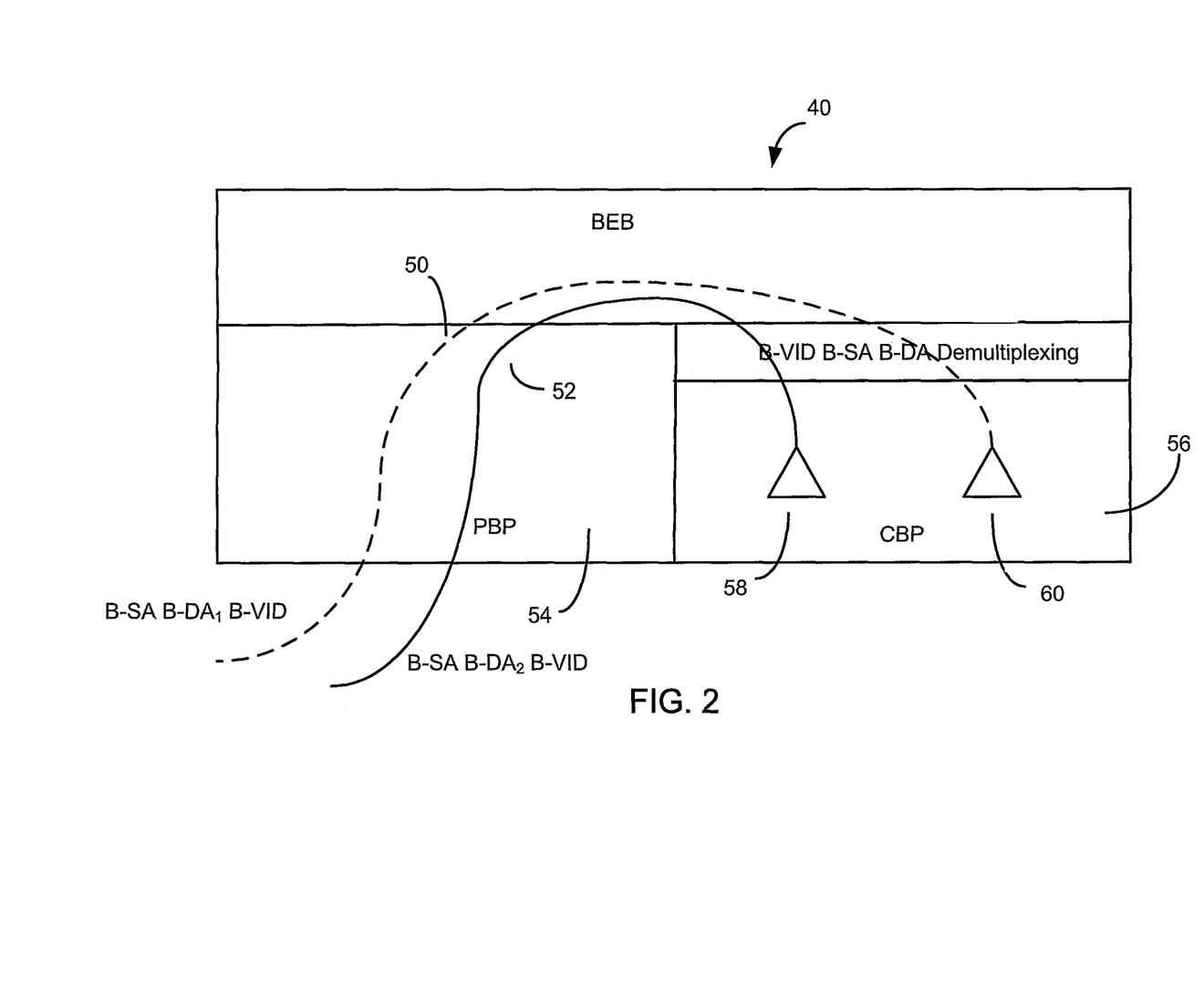
FIG. 2 illustrates the operations of a BEB receiving an ESP and ESP in the preferred embodiment of the present invention.

FIG. 2 illustrates the operations of a BEB 40 receiving an ESP 50 and ESP 52 in the preferred embodiment of the present invention. The two incoming ESPs share the same B-SA and B-VID parameter, but have different B-DAs (i.e., $B-DA_1$ and $B-DA_2$). In this situation, the full ESP ID (i.e., full ESP 3-tuple) allows demultiplexing, thereby allowing the MEPs to distinguish between CCMs that arrive on the different ESPs 50 and 52. A PBP 54 and a CBP 56 are depicted in the demultiplexing process. By utilizing the full ESP ID, each ESP allows transmittal of CCMs to distinct destinations 58 and 60.

Currently, IEEE 802.1Qay/D2.0, Draft Standard for Virtual Bridged Local Area Networks: Provider Backbone Bridges—Traffic Engineering discusses the demultiplexing of CCM frames per B-VID, B-SA. P802.1Qay/D2.0 draft section 6.19 defines the TE Service Instance Multiplex Entity to allow shims defined for PBB-TE to be instantiated per TE service instance at a Service Access Point (SAP) that supports multiple TE service instances.

Figure 3:
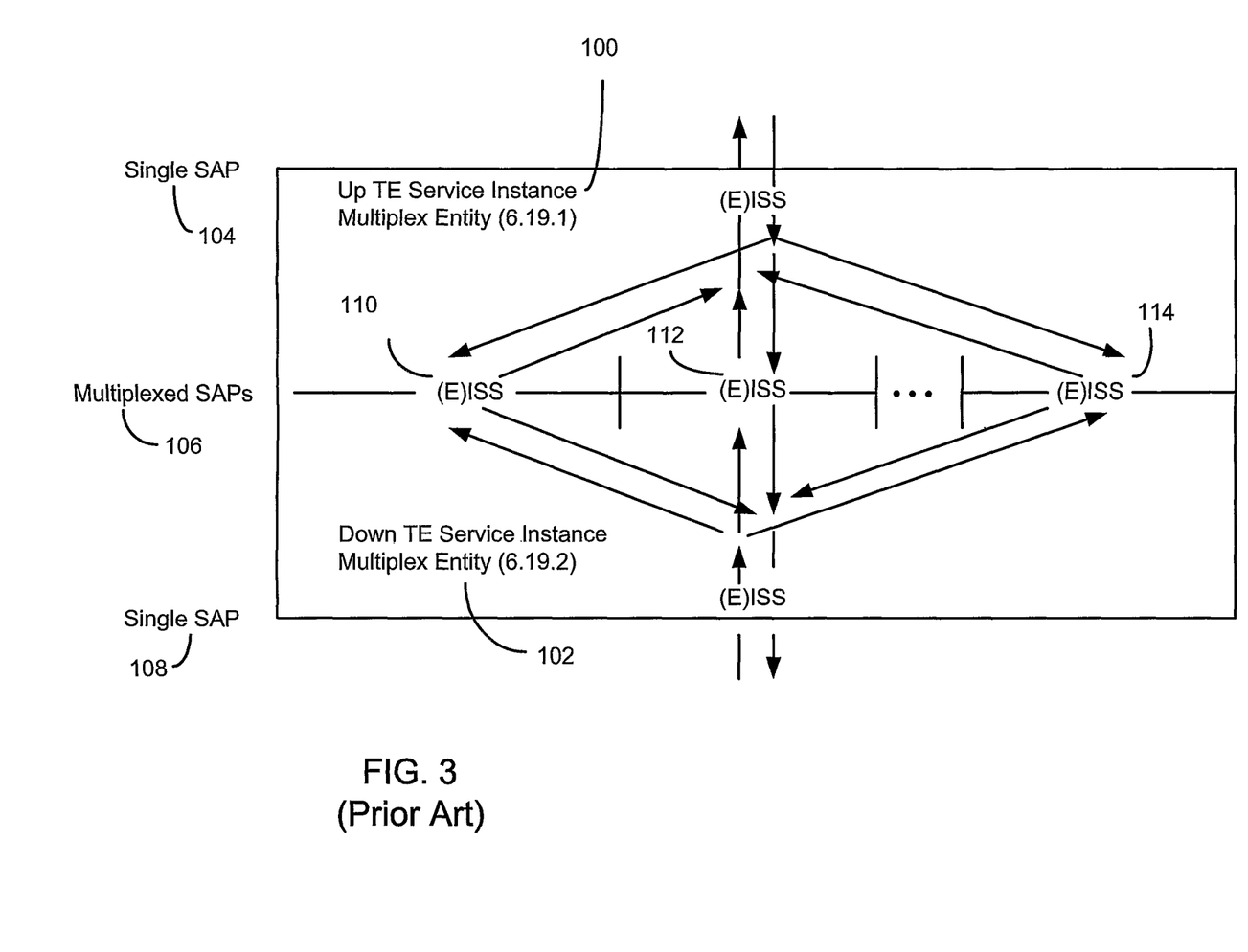
FIG. 3 (prior-art) illustrates the operation of demultiplexing in an existing system.

FIG. 3 illustrates the operation of demultiplexing in an existing system. The system includes two TE Service Instance Multiplex Entities, an Up TE Service Instance Multiplex entity 100 and a Down TE Service Instance Multiplex entity 102, which are placed back-to-back to support a multiplexed SAP. The Up TE Service Instance Multiplex Entity 100 has a single SAP 104 closer to the MAC Relay Entity (the MAC Relay Entity is not shown in FIG. 3) than a multiplexed SAP 106. The Down TE Service Instance Multiplex Entity 102 has a multiplexed SAP 108 closer to the MAC Relay entity than its single SAP. A set of back-to-back Up and Down TE Service Instance Multiplex Entities may be used at the multiplexed Enhanced Internal Sublayer Service ((E)ISS) SAPs 110, 112, and 114 that are associated with ESP-VIDs on a CBP to provide per TE service instance SAPs that support Connectivity Fault Management (CFM) shims for PBB-TE Maintenance Associations (MAs).

In the case of the Up TE Service Instance Multiplex Entity 100, each multiplexed SAP has a single source_address value assigned. Every source_address value can be assigned to a multiplexed SAP, and no source_address value is assigned to more than one multiplexed SAP. Upon receiving a request from its single (E)ISS SAP 104, the Up TE Service Instance Multiplex Entity 100 uses the source_address to select the corresponding one of its multiplexed SAPs to present the request. The request presented at the multiplexed SAPs has the same parameters as the original Request at the Single SAP. Similarly, any indication received from a multiplexed SAP is presented to the single (E)ISS SAP. The indication presented at the single SAP has the same parameters as the original indication at the multiplexed SAP. The Down TE Service Instance Multiplex Entity 102 is similar to the UP TE Service Instance Multiplex Entity in operation with the exception that the Down TE Service Instance Multiplex Entity uses the destination address to demultiplex a request presented at the single SAP.

Figure 4:
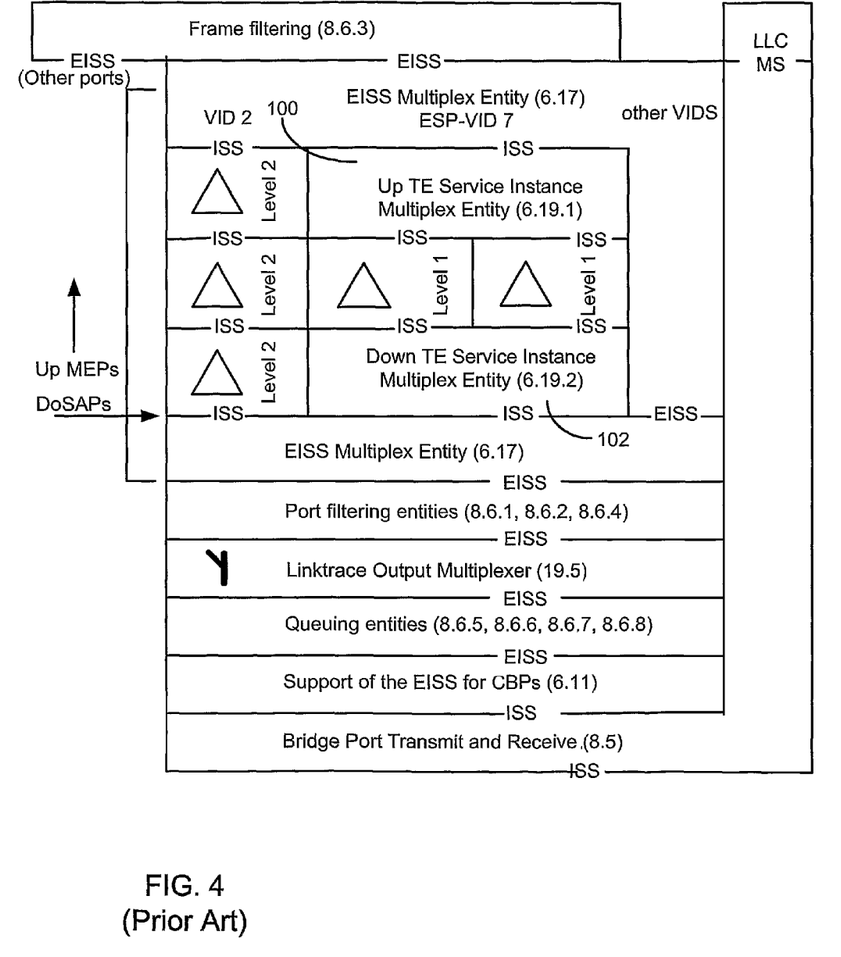
FIG. 4 (prior art) illustrates the placement of the TE Service Instance Multiplex Entities to support multiplexing of PBB-TE Up MEPs of FIG. 3.

FIG. 4 illustrates the placement of the TE Service Instance Multiplex Entities to support multiplexing of PBB-TE Up MEPs. In this existing system, the Up TE Service Instance Multiplex Entity 100 and the Down TE Service Instance Multiplex Entity 102 of FIG. 3 are utilized.

Figure 5:
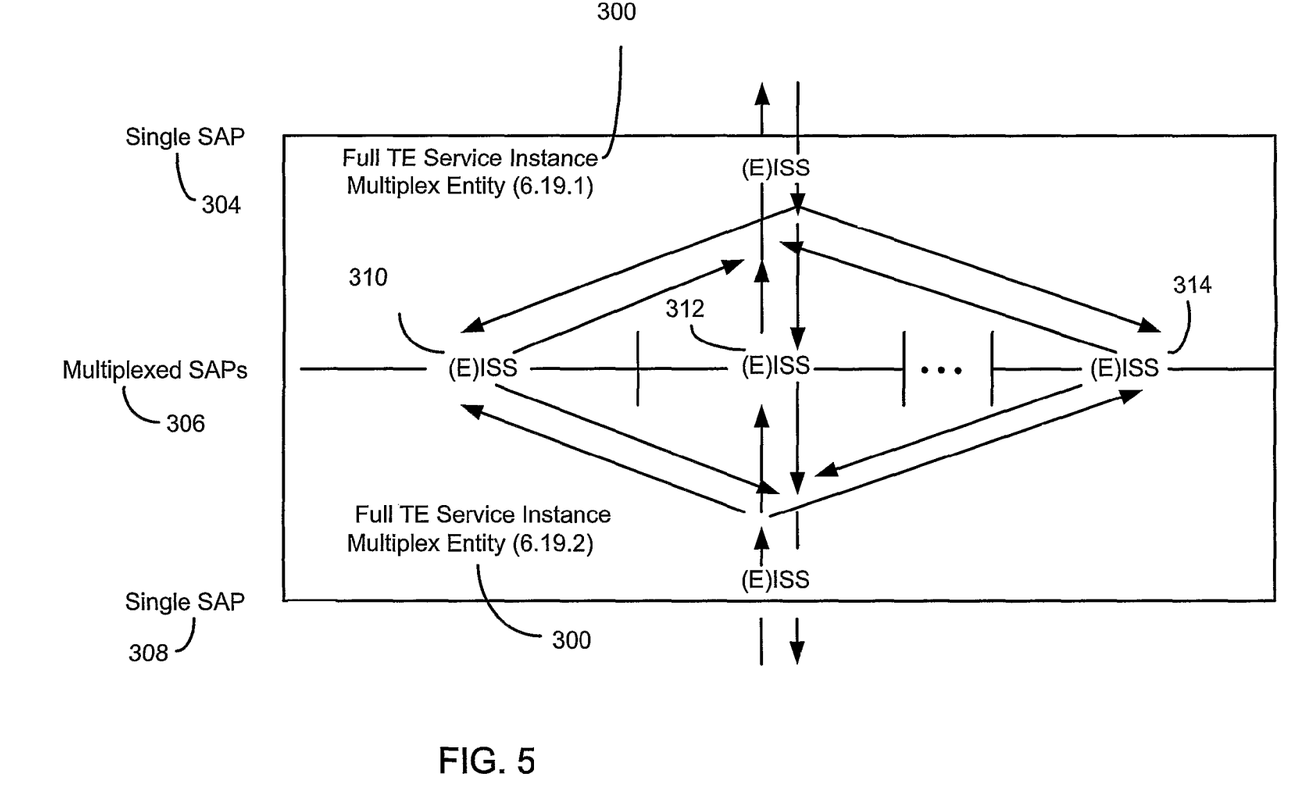
FIG. 5 illustrates the operation of demultiplexing in the preferred embodiment of the present invention.
Figure 6:
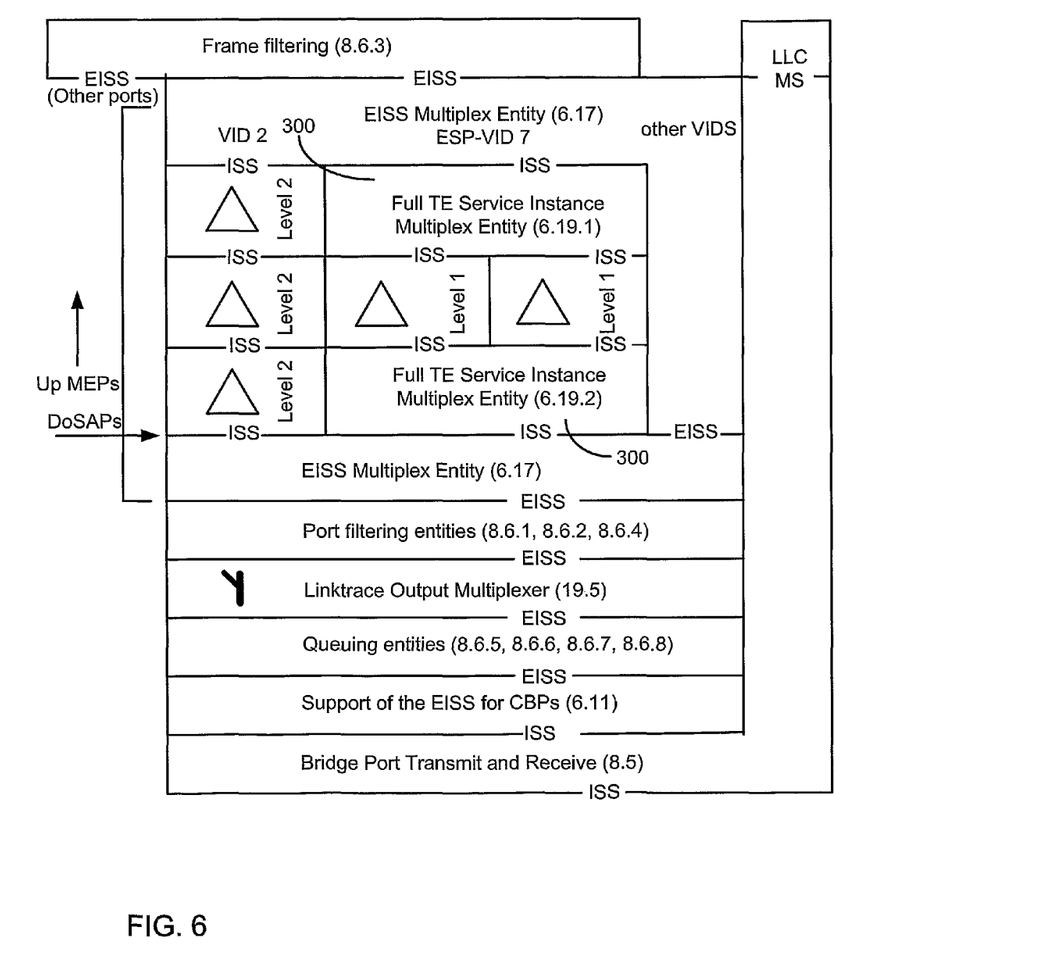
FIG. 6 illustrates the placement of the TE Service Instance Multiplex Entities to support multiplexing of PBB-TE Up MEPs.

FIG. 5 illustrates the operation of demultiplexing in the preferred embodiment of the present invention. Rather than utilizing UP and Down TE Service Instance Multiplex Entities 100 and 102, the present invention utilizes Full TE Service Instance Multiplex Entities 300. FIG. 6 illustrates the placement of the TE Service instance Multiplex Entities 300 to support multiplexing of PBB-TE Up MEPs. With this Multiplex entity 300, each multiplexed SAP 304 and 308 has a single source_address and a destination_address value assigned. Every source and destination address value is assigned to a multiplexed SAP 306. In addition, no given combination of source and destination addresses is assigned to more than one multiplexed SAP. Upon receiving a request from its single (E)ISS SAP 310, 312, or 314, the Full TE Service Instance Multiplex Entity uses the source_address and destination_address parameters to select the corresponding one of its multiplexed SAPs to present the request. The request presented at the multiplexed SAPs has the same parameters as the original request at the Single SAP. Similarly, any indication received from a multiplexed SAP is presented to the single (E)ISS SAP. The indication presented at the single SAP has the same parameters as the original indication at the multiplexed SAP.

Figure 7:
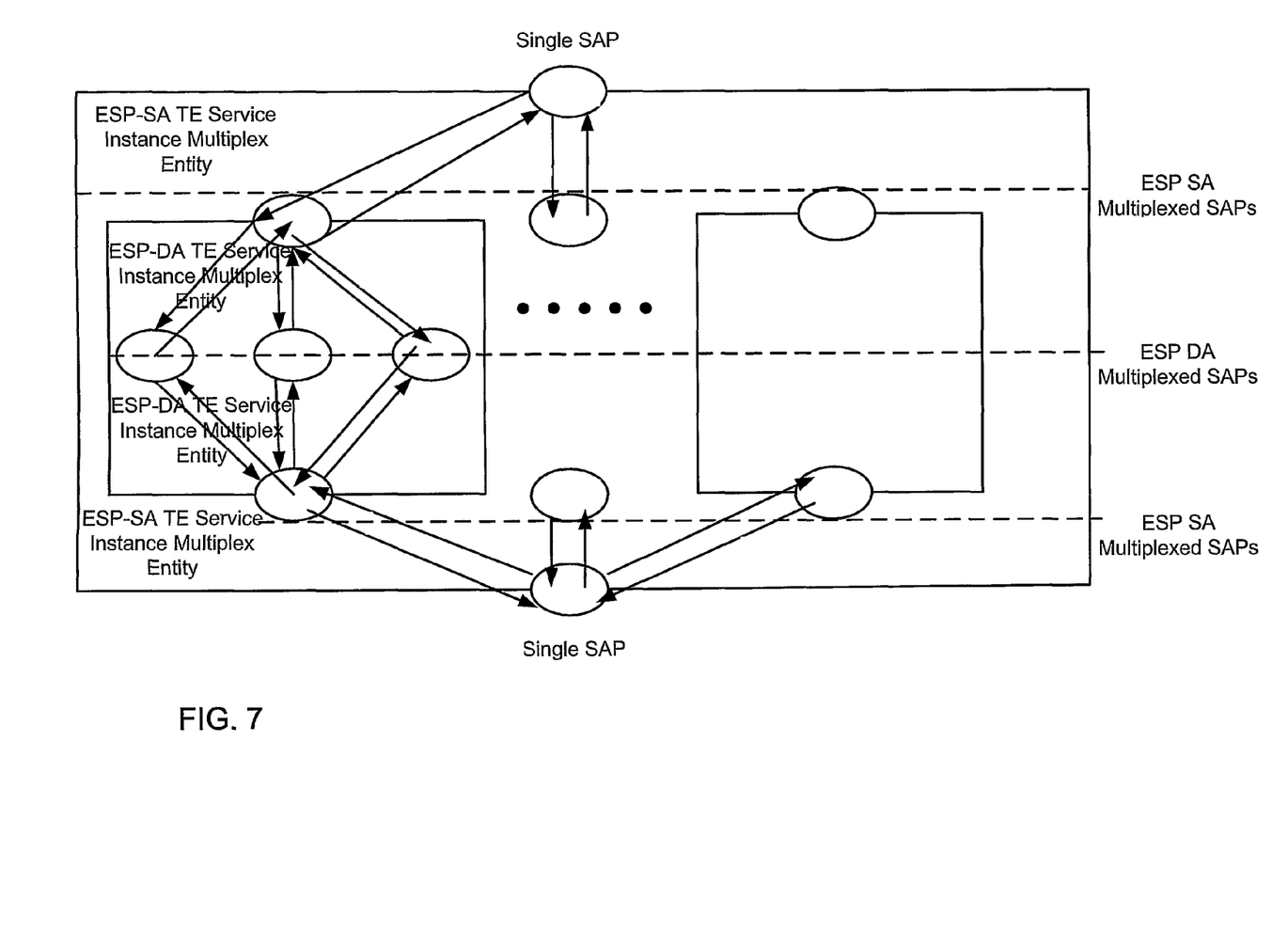
FIG. 7 illustrates a simplified block diagram of a hierarchical application of multiplex entities in an alternate embodiment of the present invention.

In an alternate embodiment of the present invention, the system utilizes a combined hierarchical application of multiplex entities. FIG. 7 illustrates a simplified block diagram of a hierarchical application of multiplex entities in an alternate embodiment of the present invention. The Up and Down TE Service Instance Multiplex Entities are used, but for better reference, the present invention utilizes the term ESP-SA TE Service instance Multiplex Entity 400 for the Up TE Service Instance Multiplex Entity and the term ESP-DA TE Service Instance Multiplex Entity 402 for Down TE Service Instance Multiplex Entity. At each multiplexed SAP of the ESP-SA TE Service Instance Multiplex Entity 400, an ESP-DATE Service Instance Multiplex Entity is placed.

Figure 8:
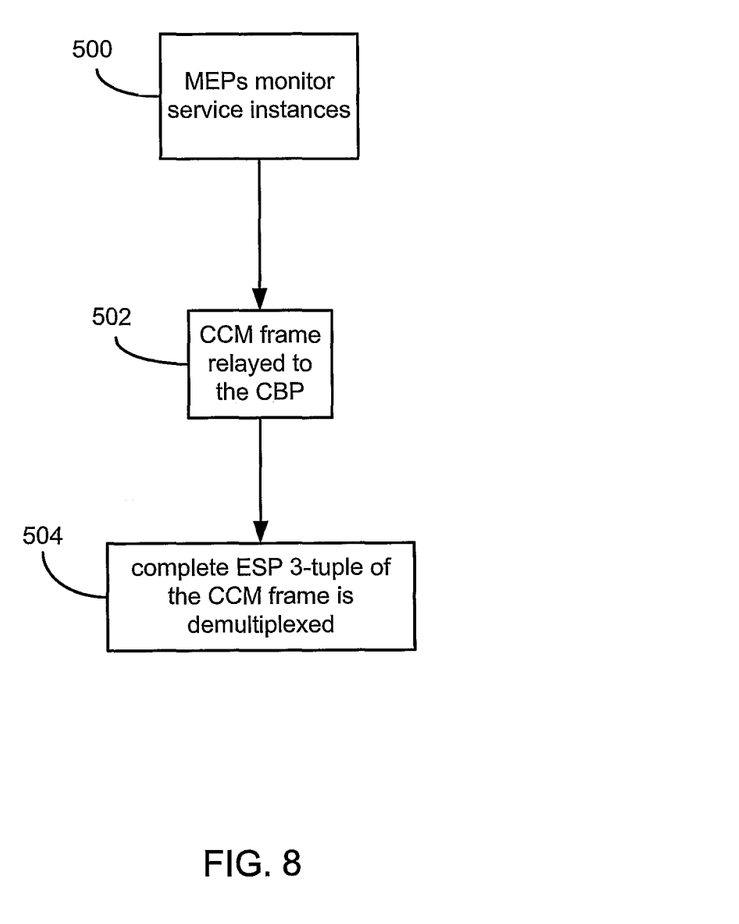
FIG. 8 is a flow chart illustrating the steps of demultiplexing PBB-TE service instances according to the teachings of the present invention.

FIG. 8 is a flow chart illustrating the steps of demultiplexing PBB-TE service instances according to the teachings of the present invention. With reference to FIGS. 2, 5, 6, and 7, the method of the present invention will now be explained. In step 500, the MEPs monitor service instances between a first bridge port to a second bridge port by exchanging frames over each instance. In the preferred embodiment, the frames are CCM frames. In step 502, each frame is then relayed to the CBP. Next, in step 504, the complete ESP 3-tuple of received frames is demultiplexed. In the present invention, rather than utilizing UP and Down TE Service Instance Multiplex Entities 100 and 102, the Full TE Service Instance Multiplex Entities 300 are employed. With the Multiplex entity 300, each multiplexed SAP 304 and 308 has a single source_address and destination_address value assigned. Every source and destination address value is assigned to a multiplexed SAP 306. In addition, no given combination of source and destination addresses is assigned to more than one multiplexed SAP. Upon receiving a request from its single (E)ISS SAP 310, 312, or 314, the Full TE Service Instance Multiplex Entity uses the source_address and destination_address parameters to select the corresponding one of its multiplexed SAPs to present the request. The request presented at the multiplexed SAPs has the same parameters as the original request at the Single SAP. Similarly, any indication received from a multiplexed SAP is presented to the single (E)ISS SAP. The indication presented at the single SAP has the same parameters as the original indication at the multiplexed SAP.

In an alternate embodiment of the present invention, the system utilizes the ESP-SA TE Service Instance Multiplex Entity 400 and the ESP-DA TE Service Instance Multiplex Entity 402. At each multiplexed SAP of the ESP-SA TE Service Instance Multiplex Entity 400, an ESP-DA TE Service Instance Multiplex Entity is placed.

The present invention enables the complete ESP 3-tuple <B-SA, B-DA, B-VID> to be used to demultiplex PBB-TE service instances in general and, in particular, the associated CCM frames. By demultiplexing both the B-SA and the B-DA of a CCM frame, unnecessary B-VID assignment restrictions are removed. In addition, the present invention provides improved sealability of the PBB-TE ESPs, especially when many point-to-multipoint PBB-TE service instances are provisioned.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of demultiplexing Provider Backbone Bridging Traffic Engineering (PBB_TE) service instances, the method comprising the steps of:
   monitoring service instances between a first bridge port and a second bridge port by exchanging frames over each service instance;
   receiving frames by the second bridge port from the first bridge port; and
   demultiplexing received frames based on a Backbone Source MAC Address (B-SA), a Backbone Destination MAC Address (B-DA), and a Backbone VLAN identifier (B-VID) associated with each of the demultiplexed frames by:
      selecting a service association point (SAP) to process a received frame based on the respective B-SA, B-DA, and B-VID associated with that frame; and
      forwarding at least a portion of the frame to the selected SAP for further processing by the selected SAP.

2. The method according to claim 1 wherein demultiplexing includes:
   assigning a destination_address value and a source_address value in each frame to a multiplexed Service Access Point (SAP) in the second bridge port.

3. The method according to claim 2 wherein a Full Traffic Engineering Service Instance Multiplex Entity assigns the destination_address value and the source_address value.

4. The method according to claim 3 further comprising utilizing the destination_address value and the source_address value to select a specified multiplexed SAP to present a request to a single SAP.

5. The method according to claim 1 wherein demultiplexing includes:
   demultiplexing a Backbone Source MAC Address (B-SA) from each received frame by a Full Traffic Engineering Service Instance Multiplex Entity; and
   demultiplexing a Backbone Destination MAC Address (B-DA) from each received frame by the Full Traffic Engineering Service Instance Multiplex Entity.

6. The method according to claim 1 wherein demultiplexing includes:
   demultiplexing a Backbone Source MAC Address (B-SA) from each received frame by a Ethernet Switched Path Source Address Traffic Engineering Service Multiplex Entity; and
   demultiplexing a Backbone Destination MAC Address (B-DA) from each received frame by a Ethernet Switched Path Destination Address Traffic Engineering Service Multiplex Entity.

7. The method according to claim 1 wherein the received frames are Continuity Check Message (CCM) frames.

8. A system for demultiplexing Provider Backbone Bridging Traffic Engineering (PBB-TE) service instances, the system comprising:
   a first Backbone Edge Bridge comprising a first bridge port;
   a second Backbone Edge Bridge comprising a second bridge port, the second bridge port configured to connect connected to the first bridge port by an Ethernet Switched Path (ESP) the second bridge port configured to monitor service instances between the first bridge port and the second bridge port by exchanging frames over each service instance: and wherein the second bridge port is further configured to demultiplex received frames based on a Backbone Source MAC Address (B-SA), a Backbone Destination MAC Address (B-DA), and a Backbone VLAN identifier (B-VID) associated with each of the demultiplexed frames by:
      selecting a service association point (SAP) to process a received frame based on the respective B-SA, B-DA, and B-VID associated with that frame; and
      forwarding at least a portion of the frame to the selected SAP for further processing by the selected SAP.

9. The system according to claim 8 wherein the second bridge port is further configured to assign a destination_address value and a source_address value in each frame to a multiplexed Service Access Point (SAP) in the second bridge port.

10. The system according to claim 9 wherein the second bridge port comprises a Full Traffic Engineering Service Instance Multiplex Entity operable to assign the destination_address value and the source_address value.

11. The system according to claim 10 wherein the Full Traffic Engineering Service Instance Multiplex Entity is operable to utilize the destination_address value and the source_address value to select a specified multiplexed SAP to present a request to a single SAP.

12. The system according to claim 8 wherein the second bridge port includes a Full Traffic Engineering Service Instance Multiplex Entity operable to demultiplex a Backbone Source MAC Address (B-SA) and a Backbone Destination MAC Address (B-DA)-from each received frame.

13. The system according to claim 8 wherein the second bridge port includes:
   an Ethernet Switched Path Source Address Traffic Engineering Service Multiplex Entity operable to demultiplex a Backbone Source MAC Address (B-SA) from each received frame; and
   an Ethernet Switched Path Destination Address Traffic Engineering Service Multiplex Entity operable to demultiplex a Backbone Destination MAC Address (B-DA) from each received frame.

14. The system according to claim 8 wherein the second bridge port is a Customer Backbone Port.

15. The system according to claim 8 wherein the received frame is a Continuity Check Message (CCM) frame.

16. A node for demultiplexing Provider Backbone Bridging Traffic Engineering (PBB-TE) service instances, the node comprising:
 a Backbone Edge Bridge that includes a bridge port operable to:
  demultiplex received frames based on a Backbone Destination MAC Address (B-DA), and a Backbone Source MAC Address (B-SA) associated with each received frame, the frames being used to monitor an ESP between the Backbone Edge Bridge and a second bridge, the frames associated with a specific service instance and received by the second bridge by:
   selecting a service association point (SAP) to process a received frame based on the respective B-SA, B-DA, and B-VID associated with that frame; and
   forwarding at least a portion of the frame to the selected SAP for further processing by the selected SAP.

17. The node according to claim 16 wherein the bridge port is further operable to assign a destination_address value and a source_address value in each received frame to a multiplexed Service Access Point (SAP) in the second bridge port.

18. The node according to claim 17 wherein the bridge port includes a Full Traffic Engineering Service Instance Multiplex Entity operable to assign the destination address value and the source_address value.

19. The node according to claim 18 wherein the Full Traffic Engineering Service Instance Multiplex Entity is operable to utilize the destination_address value and the source_address value to select a specified multiplexed SAP to present a request to a single SAP.

20. The node according to claim 18 wherein the Full Traffic Engineering Service Instance Multiplex Entity is operable to demultiplex a Backbone Source MAC Address and a Backbone Destination MAC Address from each received frame.

21. The node according to claim 16 wherein the bridge port includes:
 an Ethernet Switched Path Source Address Traffic Engineering Service Multiplex Entity operable to demultiplex a Backbone Source MAC Address from each received frame; and
 an Ethernet Switched Path Destination Address Traffic Engineering Service Multiplex Entity operable to demultiplex a Backbone Destination MAC Address from each received frame.

22. The node according to claim 16 wherein the bridge port is operable to:
 demultiplex a Backbone Source MAC Address from each received frame;
 demultiplex a Backbone Destination MAC Address from each received frame; and
 demultiplex a Backbone VLAN identifier from each received frame.

23. The node according to claim 16 wherein the received frames are a Continuity Check Message (CCM) frames.

* * * * *

UNITED STATES PATENT AND TRADEMARK OFFICE
CERTIFICATE OF CORRECTION

PATENT NO. : 8,761,034 B2
APPLICATION NO. : 12/810069
DATED : June 24, 2014
INVENTOR(S) : Gero et al.

It is certified that error appears in the above-identified patent and that said Letters Patent is hereby corrected as shown below:

On the title page, item (56), under "OTHER PUBLICATIONS", in Column 2, Line 1, delete "standars" and insert -- standards --, therefor.

On the title page, item (56), under "OTHER PUBLICATIONS", in Column 2, Lines 4-5, delete "Enineerin'" and insert -- Engineering" --, therefor.

In the Specification

Column 1, Line 40, delete "looted" and insert -- located --, therefor.

Column 2, Line 27, delete "A V-VID" and insert -- A B-VID --, therefor.

Column 2, Line 33, delete "bridge, port" and insert -- bridge port --, therefor.

Column 2, Line 61, delete "FIG. 3 (prior-art)" and insert -- FIG. 3 (prior art) --, therefor.

Column 4, Line 15, delete "instance" and insert -- Instance --, therefor.

Column 4, Line 40, delete "instance" and insert -- Instance --, therefor.

Column 5, Line 3, delete "Single" and insert -- single --, therefor.

Column 5, Line 19, delete "sealability" and insert -- scalability --, therefor.

In the Claims

Column 5, Line 56, in Claim 4, delete "comprising" and insert -- comprising: --, therefor.

Signed and Sealed this
Fourteenth Day of October, 2014

Michelle K. Lee
*Deputy Director of the United States Patent and Trademark Office*

Column 6, Lines 19-20, in Claim 8, delete "connect connected" and insert -- connect --, therefor.

Column 6, Line 53, in Claim 12, delete "(B-DA)- from" and insert -- (B-DA) from --, therefor.

Column 7, Line 26, in Claim 18, delete "destination address" and insert -- destination_address --, therefor.